United States Patent Office.

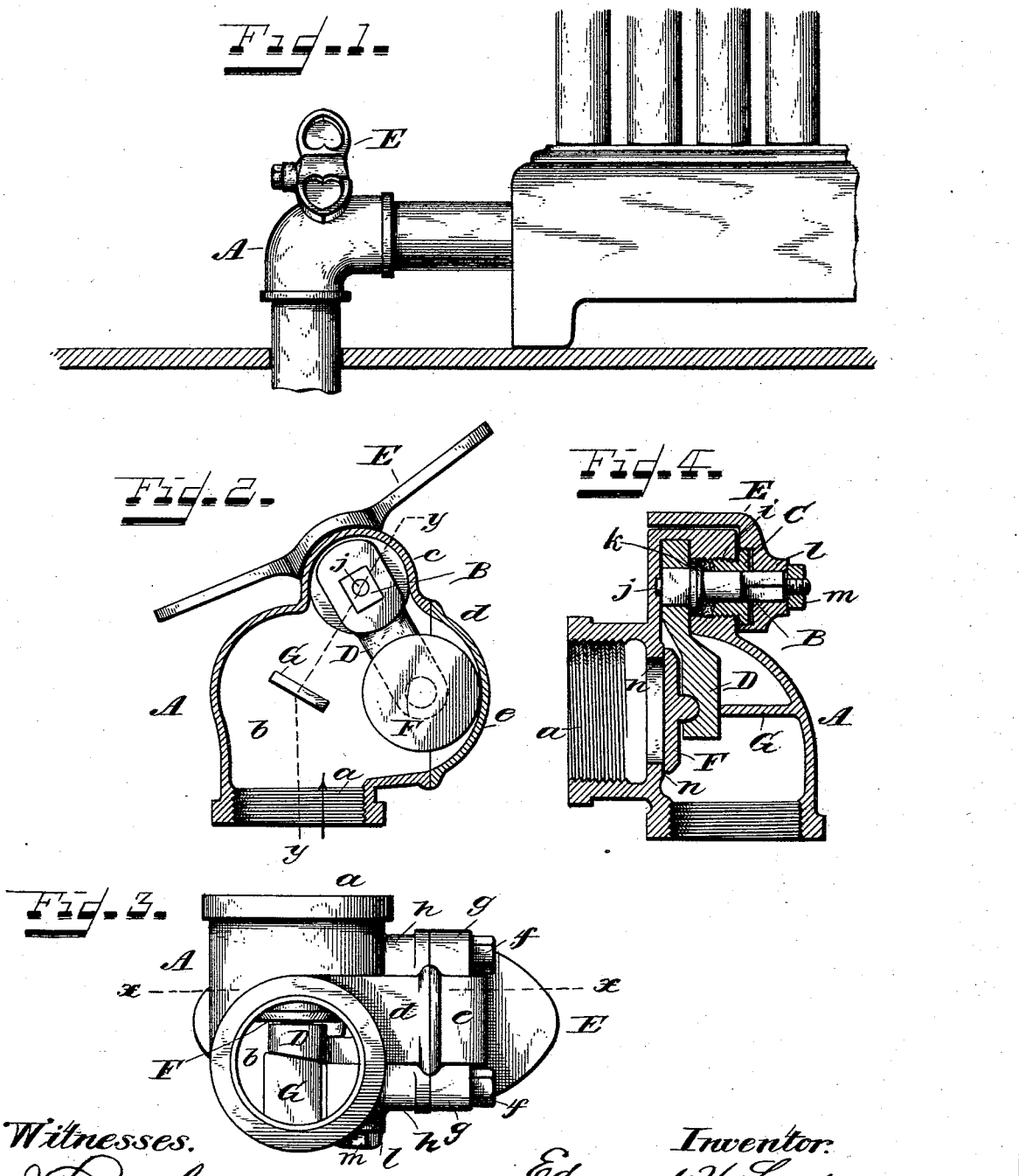

EDMUND H. LUNKEN, OF CINCINNATI, OHIO, ASSIGNOR TO THE LUNKENHEIMER COMPANY, OF SAME PLACE.

VALVE.

SPECIFICATION forming part of Letters Patent No. 498,439, dated May 30, 1893.

Application filed November 2, 1892. Serial No. 450,725. (No model.)

*To all whom it may concern:*

Be it known that I, EDMUND H. LUNKEN, a citizen of the United States, residing at Cincinnati, in the county of Hamilton and State of Ohio, have invented certain new and useful Improvements in Valves, of which the following is a full, clear, and exact description, reference being had to the accompanying drawings, forming part of the specification.

My invention relates, first, to the construction of the valve for general purposes, and, second, to its construction with special reference to its use as a pedal valve for steam or hot water radiators; and it has for its object the improved as well as simplified construction of the valve.

The novelty of my invention will be hereinafter set forth and specifically pointed out in the claims.

In the accompanying drawings:—Figure 1 is a partial view of a radiator showing the application of my valve thereto. Fig. 2 is an enlarged sectional side elevation of the valve on the dotted line $x$—$x$ of Fig. 3. Fig. 3 is an end elevation of the valve looking in the direction of the arrow in Fig. 2. Fig. 4 is a sectional view on the dotted line $y$—$y$ of Fig. 2, looking to the right.

The same letters of reference are used to indicate identical parts in all the figures.

The shell or body A of the valve is in the form of an angle-coupling with threaded pipe connections $a$, $b$ at right angles to each other and with two off-sets or chambers $c$ $d$ at the side, the latter of which is covered by a removable cap $e$ held in place, with interposed packing, by screws $f$ inserted through perforated ears $g$ (see Fig. 3) and engaging lugs $h$ on the chamber $d$. The opening covered by the cap is to permit the ready introduction of the valve disk carrier and disk. As seen in Fig. 4 one side of the chamber $c$ is thickened and has through it a central threaded bore $i$ through which passes the valve spindle B which is journaled in a stuffing box sleeve C screwed into the bore $i$ with its flanged end effecting a tight joint with the outer side of the chamber. The inner end of the spindle is squared or flattened to pass through a corresponding aperture in the inner end of the valve carrier D and its extreme end is stepped in a recess in the wall of the chamber as seen at $j$. Between the packing in the bore $i$ and the carrier D there is a collar $k$ upon the spindle which fills the bore diametrically and prevents endwise movement of the spindle, as will be readily understood. Upon the outer squared end of the spindle is fitted a pendent arm $l$ on the pedal E the inner face of which arm is recessed to receive and cover the projecting end of the stuffing box sleeve. A nut $m$ screwed upon the threaded end of the spindle serves to lock the pedal from displacement, and in tightening it up the spindle is drawn slightly out thereby compressing the packing in the stuffing box and preventing any possibility of leaking. The valve disk F is preferably loosely mounted upon the outer end of the carrier so that it will seat uniformly, though it might be fast thereon or integral therewith by allowing play between the spindle and the carrier by slightly enlarging the aperture therein for the passage of the spindle. In Fig. 2 the valve is shown open with the disk occupying the chamber $d$ while in Figs. 3 and 4 it is shown closed with the disk covering and forced to its seat $n$. To force the disk to its seat uniformly and tightly when closed I provide a rib G Figs. 2, 3, and 4, which is integral with and projects up from the shell directly behind the center of the disk when closed, and I bevel the outer end of the carrier on its under side and the upper edge of the rib so that two wedging surfaces are formed, and in this way when the disk is closed the carrier rides up on the rib and forces the disk tightly to its seat, as will be readily understood. By constructing the shell in angle form with the pipe connections at right angles to each other, I am enabled to bring the wedging rib directly opposite the center of the valve disk which not only improves the operation of the valve but simplifies its construction. Of course it is to be understood that any hand operating device might be substituted for the pedal to oscillate the spindle and cause the opening and closing of the valve.

Having thus fully described my invention, I claim—

1. In a valve having a swinging carrier and disk thereon, the combination with the operating spindle having a collar within the stuffing box, the stuffing box sleeve screwed into the valve shell and having the spindle journaled therein and provided with a flange to make a tight joint with the shell, an operating lever on said spindle and a nut for holding said lever in place and compressing the packing in the stuffing box, substantially as described.

2. In a valve having a swinging carrier and disk thereon, the combination with the operating spindle having a collar within the stuffing box, the stuffing box sleeve screwed into the valve shell and having the spindle journaled therein and provided with a flange to make a tight joint with the shell, a lever for rocking the spindle having its engaging end fitted upon the spindle and with a recess upon its inner side to receive and cover the projecting end of the stuffing box sleeve, and a nut upon the projecting end of the spindle for holding said lever in place and compressing the packing in the stuffing box, substantially as described.

3. In a valve, the combination of the shell with pipe openings at an angle to each other, a wedging rib projecting from the angle of the shell, a swinging disk carrier and disk thereon, the operating spindle having a collar within the stuffing box, the stuffing box sleeve screwed into the valve shell and having the spindle journaled therein and provided with a flange to make a tight joint with the shell, the operating lever on said spindle, and a nut for holding said lever in place and compressing the packing in the stuffing box, substantially as described.

EDMUND H. LUNKEN.

Witnesses:
J. THOMSON CROSS,
BERNARD J. HAUSFELD.